United States Patent
Qi

(10) Patent No.: US 12,048,025 B2
(45) Date of Patent: Jul. 23, 2024

(54) METHOD AND APPARATUS FOR RANDOM ACCESS CONFIGURATION IN A WIRELESS COMMUNICATION SYSTEM

(71) Applicant: Samsung Electronics Co., Ltd., Suwon-si (KR)

(72) Inventor: Yinan Qi, Staines (GB)

(73) Assignee: Samsung Electronics Co., Ltd., Suwon-si (KR)

( * ) Notice: Subject to any disclaimer, the term of this patent is extended or adjusted under 35 U.S.C. 154(b) by 370 days.

(21) Appl. No.: 17/310,013

(22) PCT Filed: Jan. 13, 2020

(86) PCT No.: PCT/KR2020/000593
§ 371 (c)(1),
(2) Date: Jul. 9, 2021

(87) PCT Pub. No.: WO2020/145782
PCT Pub. Date: Jul. 16, 2020

(65) Prior Publication Data
US 2022/0095387 A1    Mar. 24, 2022

(30) Foreign Application Priority Data
Jan. 11, 2019   (GB) ..................................... 1900387

(51) Int. Cl.
*H04W 74/08*    (2024.01)
*H04W 72/04*    (2023.01)
(Continued)

(52) U.S. Cl.
CPC ... *H04W 74/0841* (2013.01); *H04W 72/0446* (2013.01); *H04W 74/04* (2013.01); *H04W 74/0866* (2013.01); *H04W 88/14* (2013.01)

(58) Field of Classification Search
CPC ............. H04W 74/0841; H04W 74/04; H04W 74/0866; H04W 88/14; H04W 74/0833;
(Continued)

(56) References Cited

U.S. PATENT DOCUMENTS 11,805,534 B2 *  10/2023  Lee ........................ H04W 72/02
2014/0086176 A1 *  3/2014  Liu ...................... H04W 74/006
370/252

(Continued)

FOREIGN PATENT DOCUMENTS

WO    2018031170 A1    2/2018

OTHER PUBLICATIONS

Supplementary European Search Report dated Jan. 7, 2022 in connection with European Patent Application No. 20 73 8149, 10 pages.

(Continued)

*Primary Examiner* — Brian D Nguyen

(57) ABSTRACT

The present disclosure relates to a pre-5$^{th}$-Generation (5G) or 5G communication system to be provided for supporting higher data rates Beyond 4$^{th}$-Generation (4G) communication system such as Long Term Evolution (LTE). A method of operating a first integrated access and backhaul, IAB, node in a wireless communication system is provided. The first IAB node is configured with at least 2 random access channel, RACH, sets separated in one or more of: time, frequency and code, wherein the at least 2 RACH sets form a first RACH group.

20 Claims, 2 Drawing Sheets

(51) Int. Cl.
*H04W 72/0446* (2023.01)
*H04W 74/04* (2009.01)
*H04W 74/0833* (2024.01)
*H04W 88/14* (2009.01)

(58) Field of Classification Search
CPC .......... H04W 72/0446; H04W 74/006; H04W 84/047
See application file for complete search history.

(56) References Cited

U.S. PATENT DOCUMENTS

| | | | |
|---|---|---|---|
| 2018/0092139 A1 | 3/2018 | Novlan et al. | |
| 2019/0029036 A1* | 1/2019 | John Wilson | H04W 74/0833 |
| 2020/0137806 A1* | 4/2020 | Islam | H04L 27/2607 |
| 2020/0275319 A1* | 8/2020 | Murray | H04W 76/27 |
| 2023/0354130 A1* | 11/2023 | Park | H04W 36/08 |

OTHER PUBLICATIONS

International Search Report and Written Opinion of the International Searching Authority in connection with International Application No. PCT/KR2020/000593 issued May 6, 2020, 8 pages.
Intel Corporation, "PHY layer enhancements for NR IAB", 3GPP TSG RAN WG1 #95, R1-1812486, Nov. 12-16, 2018, Spokane, USA, 13 pages.
Samsung, "Necessary Enhancements for NR IAB", 3GPP TSG RAN WG1 Meeting #95, R1-1812981, Spokane, USA, Nov. 12-16, 2018, 10 pages.
Nokia, et al., "NR enhancements to support IAB", 3GPP TSG RAN WG1 Meeting #95, R1-1812700, Spokane, WA, USA, Nov. 12-16, 2018, 10 pages.
LG Electronics, "Discussions on mechanisms to support NR IAB scenarios", 3GPP TSG RAN WG1 Meeting #94bis, R1-1810273, Chengdu, China, Oct. 8-12, 2018, 7 pages.
Combined Search and Examination Report under Sections 17 and 18(3) issued Sep. 16, 2020, in connection with United Kingdom Patent Application No. GB2000446.1, 6 pages.
Ericsson, "Updated summary of 7.2.3.1 Enhancements to support NR backhaul links", 3GPP TSG RAN WG1 Meeting #94bis, R1-1812042, Chengdu, China, Oct. 8-12, 2018, 22 pages.
Communication pursuant to Article 94(3) EPC dated Feb. 29, 2024, in connection with European Patent Application No. 20738149.2, 8 pages.
Nokia et al., "NR support for IAB," 3GPP TSG RAN WG1 Meeting #94, Gothenburg, Sweden, Aug. 2018, R1-1808578, 7 pages.

* cited by examiner

[Fig. 1]
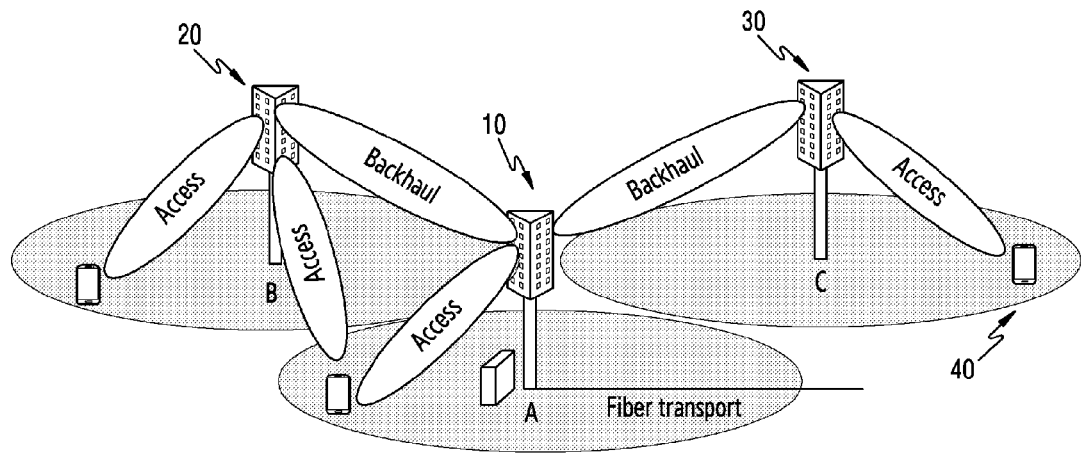
[Fig. 2]
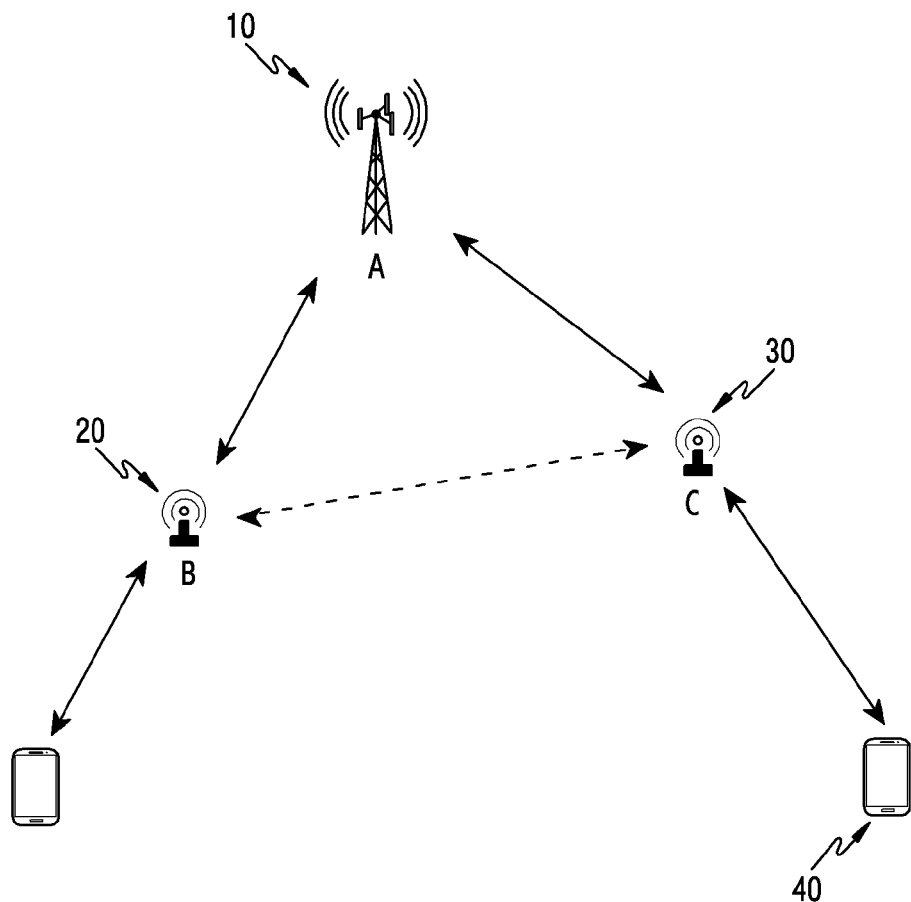

[Fig. 3]
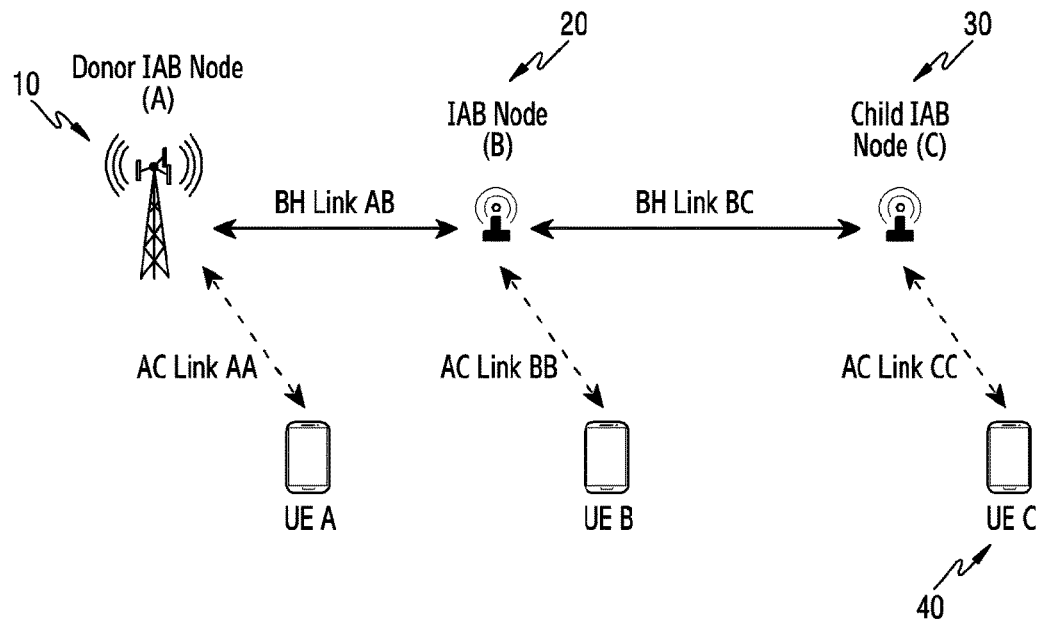
[Fig. 4]
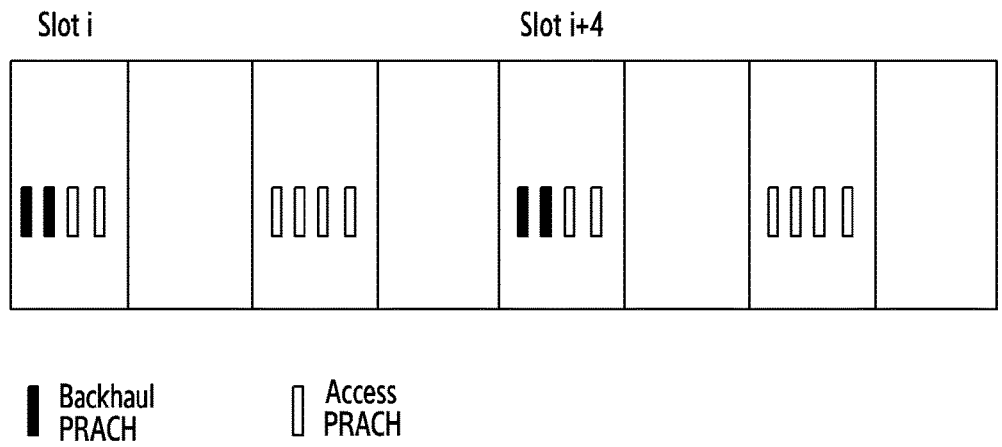
[Fig. 5]
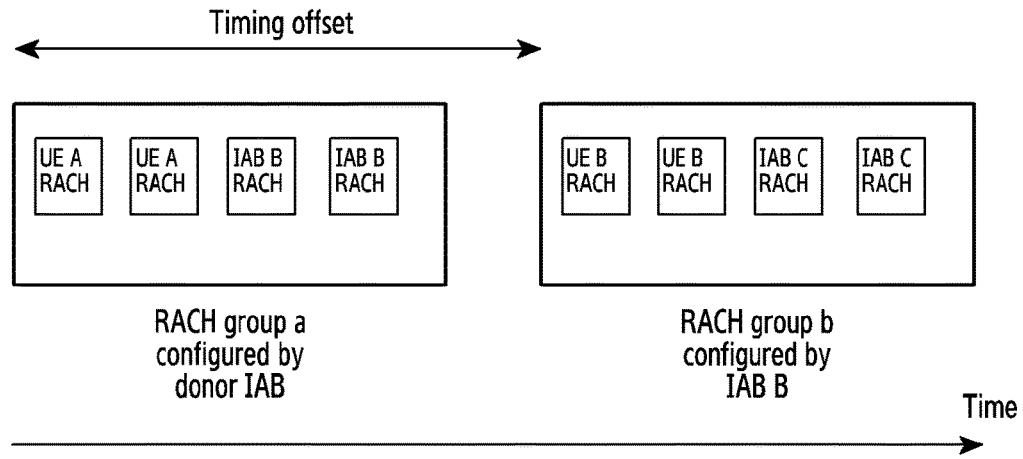

METHOD AND APPARATUS FOR RANDOM ACCESS CONFIGURATION IN A WIRELESS COMMUNICATION SYSTEM

CROSS-REFERENCE TO RELATED APPLICATIONS

This application is a 371 of International Application No. PCT/KR2020/000593, filed Jan. 13, 2020, which claims priority to United Kingdom Patent Application No. 1900387.0, filed Jan. 11, 2019, the disclosures of which are herein incorporated by reference in their entirety.

BACKGROUND

1. Field

The present disclosure relates generally to methods for wireless communication systems and, more specifically, improvements in and relating to random access configuration in a telecommunication network utilizing Integrated Access and Backhaul.

2. Description of Related Art

To meet the demand for wireless data traffic having increased since deployment of 4th generation (4G) communication systems, efforts have been made to develop an improved 5th generation (5G) or pre-5G communication system. Therefore, the 5G or pre-5G communication system is also called a 'Beyond 4G Network' or a 'Post Long Term Evolution (LTE) System'.

The 5G communication system is considered to be implemented in higher frequency (mmWave) bands, e.g., 28 GHz or 60 GHz bands, so as to accomplish higher data rates. To decrease propagation loss of the radio waves and increase the transmission distance, the beamforming, massive multiple-input multiple-output (MIMO), Full Dimensional MIMO (FD-MIMO), array antenna, an analog beam forming, large scale antenna techniques are discussed in 5G communication systems.

In addition, in 5G communication systems, development for system network improvement is under way based on advanced small cells, cloud Radio Access Networks (RANs), ultra-dense networks, device-to-device (D2D) communication, wireless backhaul, moving network, cooperative communication, Coordinated Multi-Points (CoMP), reception-end interference cancellation and the like.

In the 5G system, Hybrid frequency shift keying (FSK) and quadrature amplitude modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

SUMMARY

Various embodiments of the present disclosure provide methods and apparatuses for random access configuration in a wireless communication system.

In one embodiment, a method of operating a first integrated access and backhaul, IAB, node in a wireless communication system is provided. The first IAB node is configured with at least 2 random access channel, RACH, sets separated in one or more of: time, frequency and code, wherein the at least 2 RACH sets from a first RACH group.

Other technical features may be readily apparent to one skilled in the art from the following figures, descriptions, and claims.

Various embodiments of the present disclosure provide methods and apparatuses for random access configuration in a wireless communication system.

BRIEF DESCRIPTION OF THE DRAWINGS

For a more complete understanding of the present disclosure and its advantages, reference is now made to the following description taken in conjunction with the accompanying drawings, in which like reference numerals represent like parts:

FIG. 1 illustrates a portion of a telecommunication network utilizing IAB, according to an embodiment of the invention;

FIG. 2 illustrates a scenario with two relay TRPs connected to a donor TRP with a backup backhaul therebetween;

FIG. 3 illustrates an arrangement of a plurality of nodes in a telecommunication network utilizing IAB, according to an embodiment of the invention;

FIG. 4 illustrates time multiplexing of access link and backhaul link random access resources according to an embodiment of the invention; and FIG. 5 illustrates RACH timing offset according to an embodiment of the present invention.

DETAILED DESCRIPTION

Before undertaking the DETAILED DESCRIPTION below, it can be advantageous to set forth definitions of certain words and phrases used throughout this disclosure. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system or part thereof that controls at least one operation. Such a controller can be implemented in hardware or a combination of hardware and software and/or firmware. The functionality associated with any particular controller can be centralized or distributed, whether locally or remotely. The phrase "at least one of," when used with a list of items, means that different combinations of one or more of the listed items can be used, and only one item in the list can be needed. For example, "at least one of: A, B, and C" includes any of the following combinations: A, B, C, A and B, A and C, B and C, and A and B and C.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for other certain words and phrases are provided throughout this disclosure. Those of ordinary skill in the art should understand that in many, if not most, instances, such definitions apply to prior as well as future uses of such defined words and phrases.

Telecommunication networks which permit Access links to be shared and used as Backhaul links are known and widely expected to be utilized in networks such as those operable according to the Fifth Generation (5G) or New Radio (NR) standard.

This scenario is illustrated in FIG. 1, which show three base stations or gNBs 10, 20, 30. Of the three gNBs, only one, gNB 10, is connected by means of a fibre transport connection to the Core Network, CN. The other two gNBs 20, 30, are connected to the CN by means of radio interfaces, labelled in FIG. 1 as Backhaul, which are connected to gNB 10, which thereby connects gNBs 20, 30 to the CN.

Naturally, by sharing the air interface in this way, the prospective capacity of gNBs 20, 30 is limited, but such an integrated access and backhaul, IAB, scheme allows gNBs to be installed more easily in locations where a fibre connection is not possible or practical.

In FIG. 1, other radio connections, labelled Access, are shown for communication with several User Equipments, UE, located in the service areas of the gNBs 10, 20, 30.

In other words, the use of IAB assists in enabling future cellular network deployment scenarios and applications to support wireless backhaul and relay links enabling flexible and very dense deployment of NR cells without the need for densifying the transport network proportionately as shown in FIG. 1.

However, since the radio or air interface is now shared between access and backhaul, this introduces scheduling and other problems in terms of efficient and effective utilization of the radio links.

It is an aim of embodiments of the present invention to address such issues and others not mentioned herein.

According to the present invention there is provided an apparatus and method as set forth in the appended claims. Other features of the invention will be apparent from the dependent claims, and the description which follows.

According to a first aspect of the present invention, there is provided a method of operating a first IAB node in a telecommunication network, wherein the first IAB node is configured with at least 2 RACH sets separated in one or more of: time, frequency and code, wherein the at least 2 RACH sets form a first RACH group.

In an embodiment, a RACH set comprises a first RACH configuration relating to User Equipment, UE, access to the first IAB node and a second RACH configuration relating to backhaul access in connection with a second IAB node.

In an embodiment, the second IAB node is configured with at least 2 further RACH sets which are temporally separated from the RACH sets of the first IAB node and wherein the at least 2 further RACH sets form a second RACH group.

In an embodiment, a centralized configuration is applied whereby the first IAB node configures a different timing via the timing offset between the first and second RACH groups, or a different RACH configuration index, and such information is configured to the second IAB node.

In an embodiment, a distributed configuration is applied whereby the second IAB node received RACH configuration information for a link to the first IAB node and then, based on such RACH configuration information, the second IAB node further configures any child links subject to a half-duplex constraint.

In an embodiment, multiple RACH sets are configured in a System Information Block, SIB, and/or Remaining Minimum System Information, RMSI.

In an embodiment, the same RACH configuration is used for all RACH sets but in order to configure different timing either: a timing offset can be configured in system information blocks and/or RMSI; or a single RACH configuration for the other common parts of all RACH sets is defined but different RACH configuration indices are configured.

According to a second aspect of the present invention, there is provided a system operable to perform the method of the first aspect.

Throughout this application, the terms gNB, node and TRP are used interchangeably and the skilled person will appreciate the context.

Although a few preferred embodiments of the present invention have been shown and described, it will be appreciated by those skilled in the art that various changes and modifications might be made without departing from the scope of the invention, as defined in the appended claims.

Embodiments of the invention assist in facilitating flexible and very dense deployment of NR cells without the need for densifying the transport network proportionately.

Embodiments of the invention assist in supporting dynamic route selection to accommodate short-term blocking and transmission of latency-sensitive traffic across backhaul links.

In FIG. 1, Node A (10) is the donor IAB node and nodes B (20) and C (30) are relay IAB nodes. When nodes B and C conduct random access, to access node A, they follow the same procedure as used by any UEs within the coverage area of node A. However, if the backhaul link between nodes B and A is blocked for any reason, then node B might need to be connected to node C to form a multi-hop relay network, so that its traffic reaches node A via a hop to node C first.

This is further illustrated in FIG. 2 which illustrates a donor Transmission/Reception Point (TRP) or gNB 10 connected via backhaul links to relay TRPs (rTRPs) or gNBs 20, 30. Each of the rTRPs 20, 30 is then further connected to one or more UEs 40.

The dotted line connected between rTRPs 20, 30 represents a backup backhaul link whereby either of rTRP 20 or 30 is able to connect to TRP 10 via the other in a multi-hop manner if the primary backhaul link is blocked for any reason.

The problem with the backup backhaul link is that when the rTRP 20 attempts to monitor the channel from rTRP 30 or vice-versa, there is a need to have a slot where rTRP 20 receives and rTRP 30 transmits. However, since both are synchronized to the donor TRP 10, this may not be possible in practice.

In the case illustrated in FIGS. 1 and 2, the distance between nodes B and C could be much larger than the distance between a UE (40) being served by node B and node C. This can be seen in FIG. 1.

Since the random access preamble format is determined by the cell radius, the preamble used for node C UE might not be suitable for another IAB node, e.g., node B. Moreover, there is no need to keep the same random access periodicity for UE and TAB node access, since the connection between TAB nodes needs to be maintained after the first random access and thus requires much less frequent random access when compared with UE, where the UE may move frequently between cells and require more frequent random access as a result.

In addition, due to the half-duplex constraint, the TAB node RACH configuration for its parent links and child links should be separated. The half-duplex constraint refers to the issue whereby a given node is unable to transmit and receive at the same time. As such, scheduling of receive and transmit times is required.

FIG. 3 illustrates a representation of the three nodes A, B and C (10, 20, 30) of FIG. 1 and also illustrates more details of the backhaul (BH) links between them, as well as Access (AC) links between respective nodes and UEs.

As can be seen, Node A (10) is a donor JAB node and has a BH link (AB) to IAB node B (20), which in turn has a BH link (BC) to child IAB node C (30). The BH link (BC) is equivalent to the backup backhaul link represented by the dotted line in FIG. 2.

Each of the nodes, in turn, has an access link to a UE: Node A (10) has an AC link (AA) to UE A; node B (20) has an AC link (BB) to UE B; and node C (30) has an AC link (CC) to UE C.

Due to different coverage requirements, an access UE RACH and IAB node MT RACH should be separated in Code, Time or Frequency Multiplexing (by CDM and/or TDM and/or FDM). FIG. 4 illustrates an example of TDM only. The skilled person will appreciate that CDM and/or FDM can be used similarly to ensure the desired separation.

FIG. 4 illustrates that in a given slot i, Backhaul PRACH is scheduled for two of the possible four occasions, with UE Access PRACH scheduled for the other two of the possible four occasions. In the next permissible slot (i+2), then all four occasions are scheduled for UE Access PRACH. The scheduling pattern is set to repeat with a certain periodicity. In this case, the pattern repeats every four slots, as shown. As such, the occasions for BH PRACH are defined in terms of a given number of occasions in a given slot, with a given periodicity. In this case, 2 occasions are defined and configured every 4 slots.

This scheduling permits the backhaul PRACH to be temporally separated from the UE Access PRACH. As mentioned, similar schemes may be adopted to ensure code and/or frequency separation as well or instead.

In an embodiment, the donor IAB node (10) configures two sets of RACH, one for access UE, e.g., UE A and one for IAB node MT, e.g., IAB node B (20). These two sets of RACH are hereby denoted as "RACH group a".

In the meantime, IAB node B (20) also needs to configure two sets of RACH, one for access UE, e.g., UE B and one for IAB node MT, e.g., IAB node C (30). These two sets of RACH are hereby denoted as "RACH group b". Due to the half-duplex constraint, the RACH sets configured by the donor IAB node (10) need to be time-division multiplexed (TDMed) with RACH sets configured by IAB node B as shown in FIG. 5, which illustrates how RACH group a is temporally separated from RACH group b by a timing offset.

In this embodiment, a first option utilizes a centralized configuration, where the donor IAB node (10) configures different timing via timing offset between the RACH group a and RACH group b or different RACH configuration index and such information is configured to the IAB node (20). Essentially, the donor IAB node (10) needs to configure 4 RACH sets in total, two for parent links and two for child links.

A second option utilizes a distributed configuration, where the IAB node (20) receives RACH configuration information for its parent links (e.g. AB) and then based on such configuration information, the IAB node (20) chooses RACH sets for its child links (e.g. BC) subject to the half-duplex constraint.

In the case of the first option, the signaling overhead is larger but with a centralized configuration, the RACH configuration can be optimized. For the second option, the signaling overhead is smaller and it provides higher flexibility. However, the RACH configuration might not be optimized, compared to the first embodiment, since there is no one entity having oversight of all the RACH configurations.

Further different sub-options may be used with each of the aforementioned options, which may be used to achieve the configurations referred to.

In a first sub-option, it is possible to configure multiple RACH sets in system information blocks (SIB) and/or Remaining Minimum System Information (RMSI).

In a second sub-option, it is possible to use the same RACH configuration for all RACH sets but to configure different timing whereby either: a timing offset can be configured in system information blocks and/or RMSI; or a single RACH configuration for the other common parts of all RACH sets is defined but different RACH configuration indices are configured.

At least some of the example embodiments described herein may be constructed, partially or wholly, using dedicated special-purpose hardware. Terms such as 'component', 'module' or 'unit' used herein may include, but are not limited to, a hardware device, such as circuitry in the form of discrete or integrated components, a Field Programmable Gate Array (FPGA) or Application Specific Integrated Circuit (ASIC), which performs certain tasks or provides the associated functionality. In some embodiments, the described elements may be configured to reside on a tangible, persistent, addressable storage medium and may be configured to execute on one or more processors. These functional elements may in some embodiments include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. Although the example embodiments have been described with reference to the components, modules and units discussed herein, such functional elements may be combined into fewer elements or separated into additional elements. Various combinations of optional features have been described herein, and it will be appreciated that described features may be combined in any suitable combination. In particular, the features of any one example embodiment may be combined with features of any other embodiment, as appropriate, except where such combinations are mutually exclusive. Throughout this specification, the term "comprising" or "comprises" means including the component(s) specified but not to the exclusion of the presence of others.

Attention is directed to all papers and documents which are filed concurrently with or previous to this specification in connection with this application and which are open to public inspection with this specification, and the contents of all such papers and documents are incorporated herein by reference.

All of the features disclosed in this specification (including any accompanying claims, abstract and drawings), and/or all of the steps of any method or process so disclosed, may be combined in any combination, except combinations where at least some of such features and/or steps are mutually exclusive.

Each feature disclosed in this specification (including any accompanying claims, abstract and drawings) may be replaced by alternative features serving the same, equivalent or similar purpose, unless expressly stated otherwise. Thus, unless expressly stated otherwise, each feature disclosed is one example only of a generic series of equivalent or similar features.

The invention is not restricted to the details of the foregoing embodiment(s). The invention extends to any novel one, or any novel combination, of the features disclosed in this specification (including any accompanying claims, abstract and drawings), or to any novel one, or any novel combination, of the steps of any method or process so disclosed.

Although the present disclosure has been described with an example embodiment, various changes and modifications can be suggested by or to one skilled in the art. It is intended that the present disclosure encompass such changes and modifications as fall within the scope of the appended claims.

The invention claimed is:

1. A method performed by a first integrated access and backhaul (IAB) node connected to a core network through a fiber transport connection in a wireless communication system, the method comprising:
configuring a first random access channel (RACH) group including a first RACH set and a second RACH set, wherein the first RACH set includes scheduling information of a first user equipment (UE) access physical random access channel (PRACH) for a first UE in a service area of the first IAB node, the second RACH set includes scheduling information of a first backhaul PRACH for a second IAB node to be connected to the core network through a wireless backhaul connection with the first IAB node;
configuring first system information including the first RACH group; and
transmitting, to the first UE and the second IAB node, the first system information.

2. The method of claim 1, wherein the first RACH group is configured such that:
the first backhaul PRACH is scheduled for two of four available occasions included in a first slot and the first UE access PRACH is scheduled for remaining two occasions;
the first UE access PRACH is scheduled for all four available occurrences included in a second slot located two slots behind the first slot; and
a scheduling pattern of the first slot and the second slot is repeated every 4 slots.

3. The method of claim 1, further comprising:
configuring a timing offset between the first RACH group and a RACH group of the second IAB node, wherein the first system information further includes information on the timing offset.

4. The method of claim 3,
wherein the second RACH group includes a third RACH set and a fourth RACH set,
wherein the third RACH set includes scheduling information of a second UE PRACH for a second UE in a service area of the second IAB node, and
wherein the fourth RACH set includes scheduling information of a second backhaul PRACH for a third IAB node to be connected to the core network via the first IAB node through a wireless backhaul connection with the second IAB node.

5. The method of claim 1, wherein the first system information corresponds to a system information block (SIB) or remaining minimum system information (RMSI).

6. A method of operating performed by a second integrated access and backhaul (IAB) node in a wireless communication system, the method comprising:
receiving, from a first IAB node connected to a core network through a fiber transport connection, first system information, wherein the second IAB node is to be connected to the core network through a wireless backhaul connection with the first IAB node;
identifying a first random access channel (RACH) group included in the first system information, wherein the first RACH group includes a first RACH set and a second RACH set, wherein the first RACH set includes scheduling information of a first user equipment (UE) access physical random access channel (PRACH) for a first UE in a service area of the first IAB node, the second RACH set includes scheduling information of a first backhaul PRACH for the second IAB node;
configuring the first system information including the first RACH group; and
transmitting, to a second UE and a third IAB node, the first system information.

7. The method of claim 6, wherein the first RACH group is configured such that:
the first backhaul PRACH is scheduled for two of four available occasions included in a first slot and the first UE access PRACH is scheduled for remaining two occasions;
the first UE access PRACH is scheduled for all four available occurrences included in a second slot located two slots behind the first slot; and
a scheduling pattern of the first slot and the second slot is repeated every 4 slots.

8. The method of claim 6, wherein the first system information further includes information on a timing offset between the first RACH group and a second RACH group of the second IAB node, and
wherein the method further comprises configuring the second RACH group based on the timing offset.

9. The method of claim 8, wherein the second RACH group includes a third RACH set and a fourth RACH set,
wherein the third RACH set includes scheduling information of a second UE PRACH for the second UE in a service area of the second IAB node,
wherein the fourth RACH set includes scheduling information of a second backhaul PRACH for the third IAB node to be connected to the core network via the first IAB node through a wireless backhaul connection with the second IAB node, and
wherein the method further comprises:
configuring second system information including the second RACH group; and
transmitting, to the second UE and the third IAB node, the second system information.

10. The method of claim 6, wherein the first system information corresponds to a system information block (SIB) or remaining minimum system information (RMSI).

11. A first integrated access and backhaul (IAB) node connected to a core network through a fiber transport connection in a wireless communication system, the first TAB node comprising:
- a transceiver; and
- at least one processor coupled with the transceiver and configured to:
  - configure a first random access channel (RACH) group including a first RACH set and a second RACH set, wherein the first RACH set includes scheduling information of a first user equipment (UE) access physical random access channel (PRACH) for a first UE in a service area of the first TAB node, the second RACH set includes scheduling information of a first backhaul PRACH for a second TAB node to be connected to the core network through a wireless backhaul connection with the first TAB node,
  - configure first system information including the first RACH group, and
  - transmit, to the first UE and the second TAB node, the first system information.

12. The first TAB node of claim 11, wherein the first RACH group is configured such that:
- the first backhaul PRACH is scheduled for two of four available occasions included in a first slot and the first UE access PRACH is scheduled for remaining two occasions;
- the first UE access PRACH is scheduled for all four available occurrences included in a second slot located two slots behind the first slot; and
- a scheduling pattern of the first slot and the second slot is repeated every 4 slots.

13. The first IAB node of claim 11, wherein the at least one processor is further configured to:
- configure a timing offset between the first RACH group and a second RACH group of the second IAB node,
- wherein the first system information further includes information on the timing offset.

14. The first IAB node of claim 13,
- wherein the second RACH group includes a third RACH set and a fourth RACH set,
- wherein the third RACH set includes scheduling information of a second UE PRACH for a second UE in a service area of the second IAB node, and
- wherein the fourth RACH set includes scheduling information of a second backhaul PRACH for a third IAB node to be connected to the core network via the first IAB node through a wireless backhaul connection with the second IAB node.

15. The first IAB node of claim 11, wherein the first system information corresponds to a system information block (SIB) or remaining minimum system information (RMSI).

16. A second integrated access and backhaul (IAB) node in a wireless communication system, the second TAB node comprising:
- a transceiver; and
- at least one processor coupled with the transceiver and configured to:
  - receive, from a first TAB node connected to a core network through a fiber transport connection, first system information, wherein the second TAB node is to be connected to the core network through a wireless backhaul connection with the first TAB node,
  - identify a first random access channel (RACH) group included in the first system information, wherein the first RACH group includes a first RACH set and a second RACH set, wherein the first RACH set includes scheduling information of a first user equipment (UE) access physical random access channel (PRACH) for a first UE in a service area of the first TAB node, the second RACH set includes scheduling information of a first backhaul PRACH for the second TAB node,
  - configure the first system information including the first RACH group, and
  - transmit, to a second UE and a third TAB node, the first system information.

17. The second TAB node of claim 16, wherein the first RACH group is configured such that:
- the first backhaul PRACH is scheduled for two of four available occasions included in a first slot and the first UE access PRACH is scheduled for remaining two occasions;
- the first UE access PRACH is scheduled for all four available occurrences included in a second slot located two slots behind the first slot; and
- a scheduling pattern of the first slot and the second slot is repeated every 4 slots.

18. The second IAB node of claim 16, wherein the first system information further includes information on a timing offset between the first RACH group and a second RACH group of the second IAB node, and
- wherein the at least one processor is further configured to configure the second RACH group based on the timing offset.

19. The second IAB node of claim 18, wherein the second RACH group includes a third RACH set and a fourth RACH set,
- wherein the third RACH set includes scheduling information of a second UE PRACH for the second UE in a service area of the second IAB node,
- wherein the fourth RACH set includes scheduling information of a second backhaul PRACH for the third IAB node to be connected to the core network via the first IAB node through a wireless backhaul connection with the second IAB node, and
- wherein the at least one processor is further configured to:
  - configure second system information including the second RACH group, and
  - transmit, to a second UE and a third IAB node, the second system information.

20. The second IAB node of claim 16, wherein the first system information corresponds to a system information block (SIB) or remaining minimum system information (RMSI).

* * * * *